Patented Dec. 2, 1952

2,620,317

UNITED STATES PATENT OFFICE 2,620,317

ORGANOSILOXANE FILMS

Oscar Kenneth Johannson, Corning, N. Y., assignor to Corning Glass Works, Corning, N. Y., a corporation of New York No Drawing. Application October 13, 1947, Serial No. 779,647

2 Claims. (Cl. 260—13)

The present invention relates to independent films and to their production.

The properties of independent organic films, such as flexibility, moisture resistance, and transparency, have resulted in the use of such materials as a base for photographic film, as a decorative wrapping material, and as a preservative wrapping for perishable goods.

The desirable electrical properties and the availability of continuous sheets and tapes of certain synthetic organic films have led to the use of these films as dielectric materials. It is generally recognized that the conventional organic films are limited in their utility as dielectric materials by their thermal instability. This limitation has imposed a restriction on the safe service temperature of these insulating materials and is a limiting factor in the design of electrical apparatus in which such insulation is used.

To avoid the temperature limitations of the organic insulating materials, inorganic materials such as mica, glass fiber cloth, and asbestos have been used as dielectrics. Mica is not available in continuous sheets or tapes and is not flexible. Glass fiber cloth readily loses its insulating properties on exposure to moisture, due to the penetration of the moisture into the interstitial spaces. Glass fiber-cloth impregnated with various varnishes and resins is available, but the utility of such insulation is limited by the specific impregnant used. Asbestos is not available as an independent film and also loses its dielectric properties on exposure to moisture.

There has long been a need for insulation in the form of an independent film capable of withstanding relatively elevated temperatures and exposure to moisture without substantial deterioration.

Objects of the present invention are to provide compositions capable of being formed into independent films of commercial utility; to provide improved free or independent films which are tough, flexible, and resistant to deterioration at elevated temperatures and on exposure to moisture; to provide an improved continuous, flexible, heat resistant, independent film for use as a dielectric material; to provide an improved flexible, continuous insulating material for use in electrical equipment at temperatures above the conventional safe operating temperature of organic insulation; and to provide improved laminated products of laminae of heat resistant fabric and a tough, flexible free film which is heat and moisture resistant.

Other objects and advantages of the present invention will be apparent from the following description.

In accordance with a preferred form of the present invention, flexible, tough, heat and moisture resistant films are obtained by applying compositions comprising organo siloxane resins which contain aryl substituted siloxane units and cellulose ethers to a surface, curing the film so applied by heating and then stripping the film from the surface.

Organosiloxanes which are suitable for use in this invention are polymers comprising organo-substituted silicon oxide units, at least 50 per cent of the total number of silicon atoms being present as monoorganosilsesquioxane units, $RSiO_{1.5}$, the remaining silicon atoms being present in silicon oxide units having 3, 2, or no carbon-silicon bonds. Examples of such units are $R_3SiO_{0.5}$, $R_2SiO$, $Si(O_{0.5})_4$. In each instance, R represents a hydrocarbon radical, such as a methyl, ethyl, propyl, butyl, or phenyl radical, or combinations thereof.

In accordance with the preferred form of the invention, siloxanes of the above mentioned types are employed which contain an average of from 0.8 to 1.7 hydrocarbon radicals per silicon atom, between 10 and 60 per cent of said hydrocarbon radicals being phenyl radicals.

Organosiloxanes such as described above are available commercially, or they may be produced by methods known in the art. For example, suitable organosiloxanes may be produced by the hydrolysis of monosilanes which contain the desired organic substituents attached to the silicon atoms through carbon to silicon bonds. The remaining valence bonds of the silicon atom are attached to readily hydrolyzable atoms or groups. Such hydrolyzable groups include alkoxy radicals, for example, ethoxy, and halogen, for example, chlorine. It is preferred from a commercial standpoint to hydrolyze the silanes in mixture. However, practical results are obtained by the separate hydrolysis of the silanes, and the limited interpolymerization of the hydrolysis products in the desired proportions. The hydrolyzates produced upon hydrolysis of these silanes are partially condensed siloxane interpolymers which contain various siloxane structural units. The hydrolyzates may be bodied by heating a solution of the hydrolyzate. By such bodying, a resin is produced which is of increased viscosity, the specific viscosity depending upon the specific bodying method employed.

The hydrolyzates, the bodied resins, or a combination of the two, may be employed in the preparation of the films of the present invention. The hydrolyzates are soluble in toluene in all proportions. In the practice of the present invention the hydrolyzates may be bodied to a higher viscosity.

The ethyl cellulose employed herein contains between 45% and 52% by weight ethoxyl radicals. The ethyl cellulose is employed in amount between 20 and 40 percent by weight of total solids. Other cellulose ethers which are soluble in benzene in all proportions may be employed, for example, propyl cellulose, benzyl cellulose, and benzyl ethyl cellulose. Generally, the above described siloxanes and the soluble cellulose ethers are compatible and combinations thereof may be cast as films.

Preferably a setting catalyst for the siloxane resin is employed to promote the curing of the film. Basic organic compounds, such as the ethanolamines, or conventional paint driers, for example, the heavy metal salts of organic acids, are of utility as setting catalysts. If desired, both a basic organic compound and a paint drier may be used. The catalysts increase the curing rate of the siloxane resin in the temperature range here employed. The catalyst, when employed, is present in amount less than 5 per cent by weight based on total solids.

If desired, an antioxidant, such as a secondary aryl amine, may be added to the film-forming composition. Suitable antioxidants include diphenyl amine, p,p'-dihydroxydiphenyl amine, p,p'-diethoxydiphenyl amine and N,N'-diphenyl-1,4 phenylene diamine, all of which are effective in the compositions of this invention. Other suitable antioxidants are disclosed by R. R. McGregor and E. L. Warrick in their Patent No. 2,389,802, granted November 27, 1945. The antioxidant is present in amount less than 5 per cent by weight based on total solids.

A parting agent may be added to the composition. This parting agent permits the use of metal casting plates in the formation of films. A parting agent is usually not necessary when a glass casting surface is used. However, such an agent may be used if desired in conjunction with a glass surface to facilitate the removal of the film. The higher alkyl carboxylic acids, such as stearic acid, may be used as such parting agents. These agents are present in amount not more than 3% by weight based on total solids.

The independent films of the present invention may be formed from the compositions herein described by any appropriate method such as is known in the art. Preferably the ingredients of the compositions are thoroughly mixed as solutions thereof in compatible liquid hydrocarbons in a high-speed mixer. The solution thus formed is cast onto an endless band or drum as a thin coating. The casting surface may be metal, rubber, or glass and may be coated with a composition which is impervious to the film solvent. The film solution, present as a thin coating on the casting surface, is then subjected to heat. The application of heat vaporizes the solvent from the film solution and cures the film to a non-tacky state. The solvent may be evaporated and the film cured by passing the film on the casting surface through an oven or the like. The solvent is evaporated and the film is cured at a temperature of from 75° C. to 210° C. The time of heating is dependent upon the specific equipment employed. The cured film is stripped from the coating surface in the form of sheets. These sheets may, if desired, be cut into tapes.

Laminates comprising the compositions herein described and heat-resistant fabrics, such as glass fiber fabric and trifluoroethylene fabric, are hydrophobic and heat resistant. These laminates may be used as electrical insulating materials. The compositions may be applied to these fabrics by dipping, spraying, or otherwise contacting the surface of the fabric with the composition. The laminates may be formed by bonding alternate layers of film and fabric by conventional methods, for example, by the use of heat and pressure. A preferred method of forming such laminates is by casting the composition as a film on an impervious surface, evaporating the solvent, partially curing the composition, and then rolling the fabric into the film under tension. The tension on the glass cloth should be sufficient that the composition is forced into the interstices of the cloth but not so great that the film is forced completely through the cloth. The laminated product thus formed may receive a heat treatment to effect a further cure of the film. Desirable laminates may also be formed by repeating the process as above described, thus forming a laminate consisting of a piece of fabric between two sheets of film. Another modification of the laminating process is to coat one side of a heat-resistant fabric with a siloxane elastomer and the other side with a free film of the present invention. Satisfactory siloxane elastomers for this purpose are disclosed by Earl L. Warrick in his copending applications Serial No. 557,056, filed October 3, 1944 (now U. S. Patent No. 2,460,795), and Serial No. 651,383, filed March 1, 1946 (now abandoned).

The cellulose ethers undergo rapid oxidative degradation at temperatures near their softening points. As a result of such degradation, the cellulose ethers and films formed from them become brittle when heated at a temperature 10–20° C. below their softening points and carbonize at temperatures above their softening points.

Useful free films may be produced in accordance herewith which are flexible, heat resistant, and hydrophobic, and in which the ethyl cellulose is stabilized so that it does not have these detrimental properties.

The addition of the siloxane resins containing aryl substituted siloxane structural units to the cellulose ethers produces independent films which are capable of withstanding temperatures well above those at which degradation of the cellulose ethers occurs. These films do not become brittle and do not carbonize at such temperatures. For example, the free films of this invention containing aryl substituted siloxane structural units may be subjected to a temperature of 200° C. for more than 16 hours without failure of the film. The thermal stability of these compositions and the stabilization of the cellulose ether by the siloxane resin indicate that the components of the film have entered into combination by means of some condensation mechanism not fully understood at this time. Such a condensation mechanism may account for the other unusual physical and chemical properties of the siloxane resin-cellulose ether film.

The following examples are illustrative of modes of carrying out the invention, but are not to be construed as limiting the invention.

EXAMPLES

Example 1

A composition was prepared employing the following constituents in the indicated proportion:

| Constituent: | Per cent by weight |
|---|---|
| Siloxane resin | 80 |
| Ethyl cellulose | 20 |

The siloxane resin employed was a copolymer of the following composition:

| | Mol per cent |
|---|---|
| $CH_3SiO_{1.5}$ | 70 |
| $C_6H_5SiO_{1.5}$ | 10 |
| $(CH_3)(C_6H_5)SiO$ | 20 |

The siloxane resin was prepared by the hydrolysis of corresponding hydrolyzable silanes in the indicated proportions and was present as a toluene solution.

The ethyl cellulose contained 48.3 per cent ethoxy groups and was present as a 117 centipoise viscosity solution in a mixed solvent composed of 95 per cent by weight benzene and 5 per cent by weight methanol.

The resin and ethyl cellulose solutions were mixed, and the resultant solution was cast on polished glass plates by the use of a 3-inch doctor blade. The solvent was allowed to evaporate at room temperature for 30 minutes. The films were then dried to a solvent-free state 77° C. The films thus formed were stripped from the plates and were clear, flexible, and tack-free. The films cured at 200° C. for 1 hour were clear and semi-rigid.

*Example 2*

A composition was prepared employing the following constituents in the indicated proportion:

| Constituents: | Per cent by weight |
|---|---|
| Siloxane resin | 80 |
| Ethyl cellulose | 20 |

The siloxane resin employed was a copolymer of the following composition:

| | Mol per cent |
|---|---|
| $C_2H_5SiO_{1.5}$ | 50 |
| $C_6H_5SiO_{1.5}$ | 50 |

The siloxane resin was prepared by the hydrolysis of corresponding hydrolyzable silanes in the indicated proportions and was present as a toluene solution. The ethyl cellulose contained 51.2 per cent weight ethoxyl groups and was present as a 10 per cent by weight solution in a solvent composed of 95 per cent by weight benzene and 5 per cent by weight methanol.

The resin and ethyl cellulose solutions were thoroughly mixed, and the resultant solution was cast on polished glass plates by the use of a 3-inch doctor blade. The solvent was allowed to evaporate for 30 minutes at room temperature. The films were then dried to a solvent-free state at 77° C. The dried films were stripped and were three mils thick.

The films so formed were clear and flexible. After baking for 90 minutes at 200° C., the film had a melting point greater than 460° F.

*Example 3*

A series of three compositions was prepared employing the following constituents in the indicated proportion:

| Constituents: | Per cent by weight |
|---|---|
| Siloxane resin | 80 |
| Ethyl cellulose | 20 |

The siloxane resin employed in each case was a copolymer of the following composition:

| | Mol per cent |
|---|---|
| $C_2H_5SiO_{1.5}$ | 67 |
| $C_6H_5SiO_{1.5}$ | 33 |

The ethoxyl content of the particular ethyl cellulose used for each of the three compositions was 45.7, 48.3, and 51.2 per cent respectively. The films were formed by the same method as in Example 1. The free films thus formed with all three types of ethyl cellulose were clear and flexible. The film prepared with ethyl cellulose containing 51.2 per cent by weight ethoxyl groups did not degenerate when heated at 200° C. for 16 hours.

*Example 4*

A composition was prepared employing the following constituents in the indicated proportion:

| Constituents: | Per cent by weight |
|---|---|
| Siloxane resin | 80 |
| Ethyl cellulose | 20 |

The siloxane resin employed was a copolymer of the following composition:

| | Mol per cent |
|---|---|
| $C_2H_5SiO_{1.5}$ | 75 |
| $C_6H_5SiO_{1.5}$ | 25 |

The ethyl cellulose contained 51.2 per cent by weight ethoxyl groups. The films were formed by the same method as in Example 1. The free films thus formed were clear and flexible. After baking at a temperature of 200° C. for 20 minutes, the films were tack free.

*Example 5*

A composition was prepared employing the following constituents in the indicated proportion:

| Constituents: | Per cent by weight |
|---|---|
| Siloxane resin | 80 |
| Ethyl cellulose | 20 |

The siloxane resin employed was a copolymer of the following composition:

| | Mol per cent |
|---|---|
| $C_2H_5SiO_{1.5}$ | 85.7 |
| $C_6H_5SiO_{1.5}$ | 14.3 |

The siloxane resin was prepared by the hydrolysis of corresponding hydrolyzable silanes in the indicated proportions and was present as a toluene solution. The ethyl cellulose contained 51.2 per cent by weight ethoxyl groups and was present as a 10 per cent by weight solution in a solvent composed of 95 per cent by weight benzene and 5 per cent by weight methanol.

The films were prepared by the method used in Example 1. The free films so formed were clear and flexible. After baking for 1 hour at 200° C., the films were clear and semi-rigid.

*Example 6*

A composition was prepared employing the following constituents in the indicated proportion:

| Constituents: | Per cent by weight |
|---|---|
| Siloxane resin | 68.5 |
| Ethyl cellulose | 30.0 |
| Stearic acid | 1.5 |

The siloxane resin employed was a copolymer of the following composition:

| | Mol per cent |
|---|---|
| $C_2H_5SiO_{1.5}$ | 67 |
| $C_6H_5SiO_{1.5}$ | 33 |

This resin was present as a toluene solution thereof.

The ethyl cellulose contained 45.2 per cent by weight ethoxyl groups. The ethyl cellulose solution in a mixed solvent composed of 85 per cent by weight benzene and 15 per cent by weight methanol contained 18 per cent solids.

The siloxane resin and the stearic acid were added to the ethyl cellulose solution. The solutions were well mixed, and the resultant solution was cast by extrusion onto an endless metal belt and dried and cured by infrared light. In this manner 5 mil film was cast continuously at a belt speed of 1.75 feet per minute. The film was stripped from the belt.

The electrical properties of the dried film were as follows:

Dielectric strength _____ 2500 volts per mil
Dielectric constant _____ 2.35
Power factor _____ 0.71 per cent After baking at 200° C. for 1 hour, the electrical properties of the film were:

Dielectric strength _____ 2500 volts per mil
Dielectric constant _____ 2.89
Power factor _____ 0.39 per cent A double thickness of the dried film was wrapped around a 0.5 inch steel mandrel with a 0.25 inch overlap. 50 mil copper wire was wrapped tightly around the film-coated mandrel. The assembly was then baked for 1 hour at 200° C. A potential difference of 7000 volts between the mandrel and the wire was required to rupture the film.

*Example 7*

A laminate was formed of a glass fabric and the film of Example 6 by pressing the fabric into the film on the belt prior to drying and stripping the dried and cured film from the belt. Reinforced free film of this type is of utility in electrical insulation uses, as between the turns of a solenoid.

*Example 8*

A composition was prepared employing the following constituents in the indicated proportions:

| Constituent: | Per cent by weight |
|---|---|
| Siloxane resin | 67.0 |
| Ethyl cellulose | 26.5 |
| Diphenylamine | 2.0 |
| Triethanolamine | 3.0 |
| Stearic acid | 1.5 |

The siloxane resin employed was a copolymer of the following composition:

| | Mol per cent |
|---|---|
| $CH_3SiO_{1.5}$ | 32 |
| $C_6H_5SiO_{1.5}$ | 34 |
| $(CH_3)_2SiO$ | 34 |

This resin was prepared by the cohydrolysis of corresponding hydrolyzable silanes in a toluene-water hydrolysis medium. The water was removed by distillation and a solution of the resin in toluene remained which contained 53 per cent by weight solids.

The ethyl cellulose contained 48.5 per cent by weight ethoxyl groups and was present as a 10 per cent solution in a mixed solvent composed of 95 parts by weight benzene and 5 parts by weight methanol.

The constituents were thoroughly mixed in a high speed mixer in the indicated proportions. The resultant solution was cast on polished glass plates about 14 inches by 4.5 inches by the use of a 3-inch doctor blade. The films were then dried in an infra red oven at a maximum temperature of 118° C. for 30 minutes. The heating not only removed the solvent from the film, but also cured the films to a non-tacky state. After cooling, the films were stripped from the glass surface on which they had been formed. The films so formed were flexible and moisture and heat resistant. The electrical properties of the film are shown in Example 16.

*Example 9*

A composition was prepared as in Example 1 using the constituents in the same proportions. The siloxane resin was a copolymer of the same siloxane structural units in the same proportions as in Example 1, to which copolymer had been added 0.05 per cent by weight cobalt based on total solids in the resin solution. The cobalt was present as cobalt naphthenate. The composition was prepared in the same manner as in Example 1, and the films were formed in the same manner. The free films formed the compositions of this example were moisture resistant. The electrical properties of these films are shown in Example 16. The abnormally low change in the electrical properties of these films at high humidities appears to be due to the presence of the cobalt.

*Example 10*

A composition was prepared employing the following constituents in the indicated proportion:

| Constituent: | Parts by weight |
|---|---|
| Siloxane resin | 70 |
| Ethyl cellulose (48.3%) | 30 |
| Triethanolamine | 3.5 |
| Stearic acid | 1.5 |

The siloxane resin employed was the same as that used in Example 8. The composition was prepared and the films were formed by the same method as used in Example 8. The films so formed were flexible and water repellent.

*Example 11*

A composition was prepared employing the following constituents in the indicated proportion:

| Constituent: | Per cent by weight |
|---|---|
| Siloxane resin | 67 |
| Ethyl cellulose | 28.9 |
| p,p'-Dihydroxydiphenylamine | 2.0 |
| Diethanolamine | 2.1 |

The siloxane resin employed was a copolymer of the following composition:

| | Mol per cent |
|---|---|
| $CH_3SiO_{1.5}$ | 32 |
| $C_6H_5SiO_{1.5}$ | 34 |
| $(CH_3)_2SiO$ | 34 |

This resin was prepared by the cohydrolysis of corresponding hydrolyzable silanes in a toluene-water hydrolysis medium. The water was removed by distillation and a solution of the resin in toluene remained which contained 53 per cent by weight solids.

The ethyl cellulose contained from 51 to 52 per cent by weight ethoxyl groups and was present as a 10 per cent solution in a mixed solvent composed of 95 parts by weight benzene and 5 parts by weight methanol.

The constituents were thoroughly mixed in a high speed mixer in the indicated proportions. The resultant solution was cast on polished glass plates about 14 inches by 4.5 inches by the use of a 3-inch doctor blade. The films were dried in an infrared oven at a maximum temperature of 118° C. for 30 minutes. The heating not only removed the solvent from the films, but also cured the films to a non-tacky state. The films were stripped from the glass surface on which they had been formed. The free films were transparent and hydrophobic.

*Example 12*

A composition was prepared employing the following constituents in the indicated proportion:

Constituent: Parts by weight
 Siloxane resin _____ 70
 Ethyl cellulose _____ 30
 p,p-Diethoxydiphenylamine _____ 2.0
 Triethanolamine _____ 2.7
 Stearic acid _____ 1.5

The siloxane resin employed was a copolymer of the following composition:

| | Mol per cent |
|---|---|
| $CH_3SiO_{1.5}$ | 65.0 |
| $C_6H_5SiO_{1.5}$ | 32.5 |
| $(CH_3)_3SiO_{0.5}$ | 2.5 |

This resin was prepared by the cohydrolysis of corresponding hydrolyzable silanes in a toluene, isopropanol, and water hydrolysis medium. The water and isopropanol were removed by distillation and a solution of the resin in toluene remained.

The ethyl cellulose contained 48.5 per cent by weight ethoxyl groups and was present as a 10 per cent solution in a solvent mixture of 95 parts by weight benzene and 5 parts by weight methanol.

The constituents were thoroughly mixed in a high speed mixer in the indicated proportions. The resultant solution which contained 21.3 per cent by weight solids, was then cast on polished glass plates about 14 inches by 4.5 inches by the use of a 3-inch doctor blade. The films were then cured at a temperature of 80° C. for 2 hours. The heating not only removed the solvent from the films, but also cured the films to a non-tacky state. After cooling, the films were stripped from the glass surface on which they had been formed. The free films were hydrophobic and thermally stable.

*Example 13*

Two compositions were prepared employing the following constituents in the indicated proportions:

| Constituent | Percent by Weight | |
|---|---|---|
| | 1 | 2 |
| Siloxane resin | 66 | 67 |
| Ethyl cellulose | 27 | 28 |
| Diphenylamine | 2 | 2 |
| Triethanolamine | 3 | 3 |
| Stearic acid | 2 | |

The siloxane resins employed were copolymers of the following composition:

| | Mol percent | |
|---|---|---|
| | 1 | 2 |
| $CH_3SiO_{1.5}$ | 40 | 35 |
| $C_6H_5SiO_{1.5}$ | 20 | 30 |
| $(CH_3)(C_6H_5)SiO$ | 40 | 35 |

These resins were prepared by the cohydrolysis of corresponding hydrolyzable silanes in a toluene-water hydrolysis medium. The water was removed by distillation, and a solution of the resin in toluene remained. The hydrolyzates were bodied by heating until a solution thereof in toluene containing 50 per cent solids had a viscosity of 1 to 2 poises.

The ethyl cellulose contained 48.5 per cent by weight of ethoxyl groups and was present as a 10 per cent solution in a solvent mixture of 95 parts by weight benzene and 5 parts by weight methanol.

The constituents were thoroughly mixed in a high-speed mixer in the indicated proportions. The resultant solution was cast on polished glass plates about 14 inches by 4.5 inches by the use of a 3-inch doctor blade. The films were cured at a temperature of 80° C. for 2 hours. The heating not only removed the solvent from the films, but also cured the films to a non-tacky state. After cooling, the films were stripped from the glass surface on which they had been formed. The free films so formed were flexible and moisture and heat resistant. The films also have desirable dielectric properties.

A laminated film was formed of this material and glass fabric as above described. This product was smooth and glossy on the film side. The product was flexible, transparent, and had high tensile strength and good electrical properties.

The breakdown voltage was determined in the following manner: Test coils were prepared by wrapping a piece of 0.125 in. x 0.75 in. x 8 in. copper strap with the dielectric to be tested. The dielectric was 0.003 inch thick. An identical piece of copper was placed next to the insulated piece with a lap joint of approximately 5 inches and bound firmly in place with 0.75 inch glass tape. Both ends of the copper straps were left bare to make the electrical connections.

The breakdown voltage of the laminate formed from the glass cloth and film was 2100 volts. The breakdown voltage of mica-glass tape insulation under like conditions was 1200 volts.

*Example 14*

A composition was prepared employing the following constituents in the indicated proportions:

Constituent: Per cent by weight
 Siloxane resin _____ 65.7
 Ethyl cellulose _____ 28
 Diphenylamine _____ 1.9
 Triethanolamine _____ 3.0
 Stearic acid _____ 1.4

The siloxane resin employed was a copolymer of the following composition:

| | Mol per cent |
|---|---|
| $CH_3SiO_{1.5}$ | 30 |
| $C_6H_5SiO_{1.5}$ | 35 |
| $(CH_3)_2SiO$ | 30 |
| $(CH_3)(C_6H_5)SiO$ | 5 |

The resin was prepared by the cohydrolysis of corresponding hydrolyzable silanes in a toluene-water hydrolysis medium. The water and toluene were removed by distillation. The hydrolyzate was bodied by heating at a temperature of from 140° C. to 170° C. until a 50 per cent by weight solution of the resin in toluene had a kinematic viscosity of 85 centistokes at 25° C. A 60 per cent solution based on total solid constant of the resin in toluene was employed.

The ethyl cellulose contained 48.5 per cent by weight ethoxyl groups and was present as a 10 per cent solution in a solvent mixture of 95 parts by weight benzene and 5 parts by weight methanol.

The constituents were thoroughly mixed in a high-speed mixer in the indicated proportions. The resultant solution was cast on polished glass plates about 14 inches by 4.5 inches by the use of a 3-inch doctor blade. The films were cured at a temperature of 80° C. for 2 hours. The heating not only removed the solvent from the films, but also cured the films to a non-tacky state. After cooling, the films were stripped from the glass surface on which they had been formed. The free films were flexible and heat resistant. The electrical properties of the films are shown in Example 16.

*Example 15*

A composition was prepared employing the following constituents in the indicated proportion:

| Constituent | Per cent by weight |
|---|---|
| Siloxane resin | 67.0 |
| Ethyl cellulose | 28.0 |
| Diphenylamine | 2.0 |
| Triethanolamine | 3.0 |

The siloxane resin employed was a copolymer of the following composition:

| | Mol per cent |
|---|---|
| $CH_3SiO_{1.5}$ | 32 |
| $C_6H_5SiO_{1.5}$ | 32.7 |
| $(CH_3)_2SiO$ | 12.35 |
| $(CH_3)(C_6H_5)SiO$ | 22.7 |
| $(CH_3)_3SiO_{0.5}$ | 0.25 |

This resin was prepared by the cohydrolysis of corresponding hydrolyzable silanes in a toluene-water hydrolysis medium. The water was then removed by distillation, and a solution of the resin in toluene remained which contained 51 per cent by weight solids. To this was added 0.05 per cent by weight cobalt, in the form of cobalt naphthenate.

The ethyl cellulose contained 48.5 per cent by weight ethoxyl groups and was present as a 10 per cent solution in a solvent mixture of 95 parts by weight benzene and 5 parts by weight methanol.

The constituents were thoroughly mixed in a highspeed mixer in the indicated proportions. The resultant solution was cast on polished glass plates about 14 inches by 4.5 inches by the use of a 3-inch doctor blade. The films were cured at a temperature of 80° C. for 2 hours. The heating not only removed the solvent from the films, but also cured the films to a non-tacky state. After cooling, the films were stripped from the glass surface on which they had been formed. The free films were transparent, hydrophobic, and thermally stable. The films of this example possessed dielectric properties comparable to those of Example 8.

*Example 16*

The electrical properties of the films prepared as described in Examples 8, 9, and 14 were determined and are shown in Tables I and II. The dielectric constant, the dielectric strength, and the power factor were determined at 50 per cent and 100 per cent relative humidity. The values at 100 per cent humidity were determined after soaking the films in water for 24 hours.

TABLE I.—ELECTRICAL PROPERTIES, 50% RELATIVE HUMIDITY

| Film | | Dielectric Constant (1,000 cycles) | Dielectric Strength (volts/mil) | Power Factor (Percent) |
|---|---|---|---|---|
| Example | Thickness | | | |
| | Mils | | | |
| 8 | 1 | 2.77 | 2,500 | 1.13 |
| | 2 | 2.72 | 4,500 | 0.585 |
| 9 | 3 | 2.88 | 3,500 | 0.61 |
| 14 | 3 | 2.99 | 2,600 | 0.91 |

TABLE II.—ELECTRICAL PROPERTIES, 100% RELATIVE HUMIDITY

| Film | | Dielectric Constant (1,000 cycles) | Dielectric Strength (volts/mil) | Power Factor (Percent) |
|---|---|---|---|---|
| Example | Thickness | | | |
| | Mils | | | |
| 8 | 1 | 2.76 | 2,000 | 1.32 |
| | 2 | 2.37 | 3,750 | 0.813 |
| 9 | 3 | 2.85 | 3,300 | 0.75 |
| 14 | 3 | 2.95 | 2,100 | 1.26 |

That which is claimed is:

1. An independent film comprising from 60 to 80 percent by weight of a resinous polymeric organosiloxane which contains an average of from 0.8 to 1.7 hydrocarbon radicals per silicon atom, between 10 and 60 percent of said radicals being phenyl radicals and the remaining radicals being of the group consisting of methyl and ethyl radicals, and from 20 to 40 percent by weight of ethylcellulose which contains from 45 to 52 percent by weight of ethoxyl radicals.

2. A composition of matter comprising from 60 to 80 percent by weight of a resinous polymeric organosiloxane which contains an average of from 0.8 to 1.7 hydrocarbon radicals per silicon atom, between 10 and 60 percent of said radicals being phenyl radicals and the remaining radicals being of the group consisting of methyl and ethyl radicals, and from 20 to 40 percent by weight of ethylcellulose which contains from 45 to 52 percent by weight of ethoxyl radicals, said ethylcellulose being completely soluble in an aromatic hydrocarbon and said organosiloxane being sufficiently soluble in an aromatic hydrocarbon to give a gel-free viscous solution.

OSCAR KENNETH JOHANNSON.

REFERENCES CITED

The following references are of record in the file of this patent:

UNITED STATES PATENTS

| Number | Name | Date |
|---|---|---|
| 2,144,548 | Safford | Jan. 17, 1939 |
| 2,212,400 | Letteron | Aug. 20, 1940 |
| 2,258,218 | Rochow | Oct. 7, 1941 |
| 2,258,222 | Rochow | Oct. 7, 1941 |
| 2,351,208 | Herrmann et al. | June 13, 1944 |
| 2,419,281 | Noble | Apr. 22, 1947 |
| 2,432,752 | Gray | Dec. 16, 1947 |
| 2,463,974 | Johannson | Mar. 8, 1949 |
| 2,466,434 | Johannson | Apr. 5, 1949 |

OTHER REFERENCES

Modern Plastics, "Silicone Resin Bonded Laminates," March 1946, pp. 160–162, pp. 192–194.

The Iron Age, "Fiberglas Laminated Plastics," July 22, 1943, pp. 51–54.